No. 823,093. PATENTED JUNE 12, 1906.
H. B. WILLIAMS.
WHEEL RIM.
APPLICATION FILED FEB. 3, 1905.

WITNESSES:
Fred White
René Briune

INVENTOR:
Harry B. Williams,
By Attorneys

UNITED STATES PATENT OFFICE.

HARRY B. WILLIAMS, OF NEW YORK, N. Y.

WHEEL-RIM.

No. 823,093.   Specification of Letters Patent.   Patented June 12, 1906.

Application filed February 3, 1905. Serial No. 244,039.

*To all whom it may concern:*

Be it known that I, HARRY B. WILLIAMS, a citizen of the United States, residing in the borough of Brooklyn, county of Kings, city and State of New York, have invented certain new and useful Improvements in Wheel-Rims, of which the following is a specification.

The tires of automobiles or other rubber-tired vehicles are usually made of the "clencher" type, the tire, or at least the outer casing thereof, having lugs at its edges which engage within overhanging flanges of trough-shaped rims. To remove such tires, it is necessary to press one of the edges of the tire or of the casing inward until the lug thereon can be withdrawn from the flange of the rim. The tires are ordinarily very stiff, and it is difficult to get the edge of the tire out from under the flange of the rim.

The present invention provides a form of rim and fastening device which facilitates the removal of the tire. To this end one side of the rim is made separable from the other, preferably by a direct transverse movement. The construction is such as to hold the parts of the rim fastened or locked in position when the tire is in use, and to permit the separation of the parts of the rim at other times.

Other advantages are referred to hereinafter.

The accompanying drawings illustrate embodiments of the invention.

Figure 1:
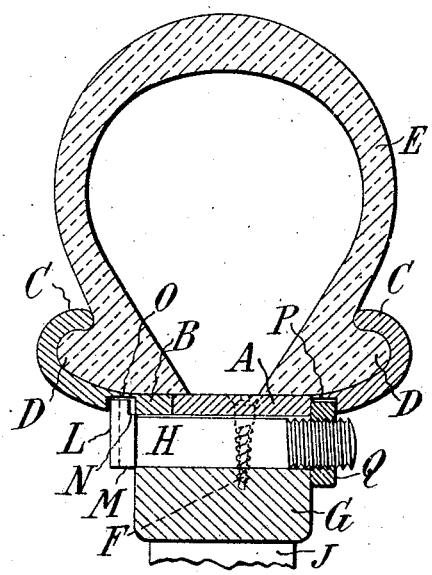
Figure 2:
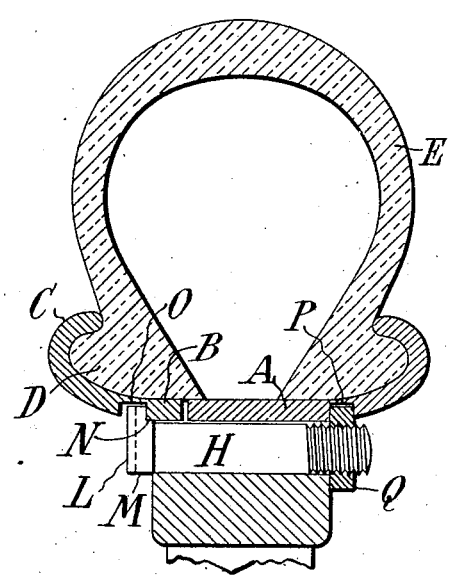
Figure 3:
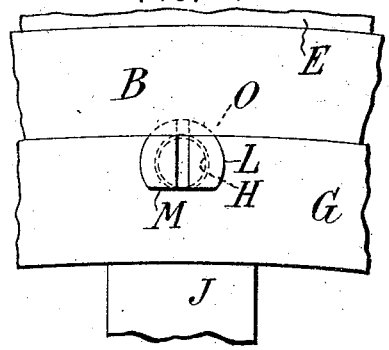

Figure 1 is a cross-section through a rim and tire in the unlocked position of the parts. Fig. 2 is a similar section when the parts are locked together. Fig. 3 is a side view of the rim of Fig. 1.

An important feature of the invention is that it utilizes a form of rim which is now in general use and which can be cheaply obtained or manufactured and that it involves very little modification of this rim. These facts and the simplicity of operation present great advantages in favor of this invention as compared with other devices for the same purpose.

Referring especially to the drawings, the usual trough-shaped metal rim is shown divided into two parts A and B, each of which has a flat portion forming a continuation of the other and bearing directly on the wooden felly, and an overhanging flange C, engaging and holding the lug or flange D, of rubber or similar composition, which extends along the edge of the tire E. When the tire is inflated, the flanges D are pressed so strongly under the flanges C as to resist the various side strains tending to tear the tire from the rim. When the tire is deflated, it may be stripped from the rim by first squeezing together the edges of the tire, so that one of the flanges D may be slipped out from under the corresponding flange C. The operation of applying a new tire is just the reverse, as will be understood. The squeezing together of the inner edges of the tire over a sufficient length of tire to permit the lifting of the flange D out over the flange C is a matter of great labor with the usual stiff tires. Therefore by dividing the rim into two parts A and B and making these parts separable from each other the labor and time involved in the changing of an old tire for a new one are very much reduced. Preferably one of the sides, as A, is fastened in the usual way, as by screws F, to the wooden felly or rim G, and the other side B of the metal rim is removable. To facilitate fastening, the part A may be made slightly wider than the part B, as illustrated. It is to be understood, however, that the division may be effected at any point from one end to the other of the cross-section of the trough-shaped rim without departure from the invention, and any suitable means for holding one or both of the parts in operative position may be adopted.

A suitable fastening arrangement comprises a number of bolts H, which may be arranged one at each spoke J. Each of these bolts has a notched head L to permit it to be operated with a screw-driver, the head being cut away at one edge to form a recess M and being rabbeted on its inner face to form a locking-shoulder N, preferably opposite the recess M. Recesses O and P are formed at corresponding intervals on the under sides of the members A and B of the rim, the former accommodating the head L of the bolt and the latter accommodating and locking the nut Q on the opposite end of the bolt. The bolts H are preferably placed as near the metal rim A B as possible, though they may be moved farther away therefrom by enlarging the bolt-head L and nut Q. When the tire is deflated, the parts A and B of the rim may be very easily pressed together in the manner shown in Fig. 1, and the several bolts H given a half-turn. Thereupon the ring constituting the part B may be removed by a direct lateral movement and the tire easily removed in a similar manner. The removable portion B will preferably be placed upon the outer side of the wheel—that is to say, the side farthest away from the body of the vehicle. When a tire is applied on the rim, the parts B and A may be similarly pressed together to permit the turning of the bolt-heads back to the position of Fig. 1. Thereupon when the tire is released the spring of the rubber or the air-pressure therein, or both, serve to spread the edges of the tire in the manner shown in Fig. 2, thus pressing the part B of the rim outward, so that the under face thereof engages the locking-shoulder N on the bolt-head and prevents the turning of the latter. This arrangement therefore constitutes a very simple and very strong lock which holds more strongly the greater the pressure on the tire, but which when the pressure is removed permits unlocking with the greatest ease and despatch.

Preferably the inner edge of the tire overlaps the dividing-line between A and B, so as to close the slit and prevent or retard the escape of air therethrough, and, where an inner tube is used, to prevent this inner tube being squeezed out into the slit.

Though I have described with great particularity of detail certain specific apparatus embodying my invention, yet it is not to be understood therefrom that the invention is limited to the specific embodiments illustrated. Various modifications thereof in detail and in the arrangement and combination of the parts may be made by those skilled in the art without departure from the invention.

What I claim is—

A bolt for holding a member upon a wheel-rim, having a head cut away at one edge to form a recess M, and rabbeted on its inner face to form a locking-shoulder N, in combination with a removable member having a shoulder adapted to engage the locking-shoulder N on the head of the bolt under normal conditions to lock the bolt.

In witness whereof I have hereunto signed my name in the presence of two subscribing witnesses.

HARRY B. WILLIAMS.

Witnesses:
 DOMINGO A. USINA,
 THEODORE T. SNELL.